(12) United States Patent
Balluchi et al.

(10) Patent No.: US 10,983,727 B2
(45) Date of Patent: Apr. 20, 2021

(54) DETERMINATION OF DATA INTEGRITY BASED ON SENTINEL CELLS

(71) Applicant: Micron Technology, Inc., Boise, ID (US)

(72) Inventors: Daniele Balluchi, Cernusco Sul Naviglio (IT); Paolo Amato, Treviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/557,245

(22) Filed: Aug. 30, 2019

(65) Prior Publication Data

US 2020/0019347 A1 Jan. 16, 2020

Related U.S. Application Data

(63) Continuation of application No. 16/033,430, filed on Jul. 12, 2018, now Pat. No. 10,585,625.

(51) Int. Cl.
*G06F 3/06* (2006.01)
*G06F 11/07* (2006.01)

(52) U.S. Cl.
CPC .......... *G06F 3/0659* (2013.01); *G06F 3/0619* (2013.01); *G06F 3/0679* (2013.01); *G06F 11/0727* (2013.01); *G06F 11/0751* (2013.01); *G06F 11/0793* (2013.01)

(58) Field of Classification Search
CPC ................................. G06F 12/0246
See application file for complete search history.

(56) References Cited

U.S. PATENT DOCUMENTS

| 8,997,255 | B2 | 3/2015 | Fusella et al. | |
|---|---|---|---|---|
| 2010/0157671 | A1* | 6/2010 | Mokhlesi | G11C 16/3418 365/185.03 |
| 2011/0096601 | A1 | 4/2011 | Gavens et al. | |
| 2012/0284574 | A1 | 11/2012 | Avila et al. | |
| 2013/0031430 | A1 | 1/2013 | Sharon | |
| 2013/0268725 | A1 | 10/2013 | Faber | |
| 2015/0085575 | A1 | 3/2015 | Tam | |
| 2016/0054937 | A1* | 2/2016 | Tuers | G11C 16/3495 711/103 |

OTHER PUBLICATIONS

International Search Report and Written Opinion from related international patent application No. PCT/US2019/040443, dated Oct. 24, 2019, 13 pages.

* cited by examiner

*Primary Examiner* — Edward J Dudek, Jr.
(74) *Attorney, Agent, or Firm* — Brooks, Cameron & Huebsch, PLLC (57) ABSTRACT

An apparatus can have an array of memory cells and a controller coupled to the array. The controller can be configured to read a group sentinel cells of the array and without reading a number of other groups of cells of the array to determine that data stored in the number of other groups of cells lacks integrity based on a determination that data stored in the group of sentinel cells lacks integrity.

20 Claims, 4 Drawing Sheets

DETERMINATION OF DATA INTEGRITY BASED ON SENTINEL CELLS

PRIORITY INFORMATION

This application is a Continuation of U.S. application Ser. No. 16/033,430, filed on Jul. 12, 2018, the contents of which are incorporated herein by reference.

TECHNICAL FIELD

The present disclosure relates generally to apparatus, such as data storage systems, and their operation, and, more particularly, to determination of data integrity based on sentinel cells.

BACKGROUND

Storage systems may be implemented in electronic systems, such as computers, cell phones, hand-held electronic devices, etc. Some storage systems, such as solid state drives (SSDs), embedded Multi-Media Controller (eMMC) devices, Universal Flash Storage (UFS) devices, and the like may include non-volatile storage memories for storing user data from a host. Non-volatile storage memories provide persistent data by retaining stored data when not powered and may include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), ferroelectric random access memory (FeRAM), magnetoresistive random access memory (MRAM), and programmable conductive memory, among other types of memory.

Non-volatile memory cells can be programmed to a desired state, such as to one of multiple states. A memory cell programmed as a single level cell (SLC) can store one of two binary states (e.g., 1 or 0). A memory cell programmed as a multi-level cell (MLC) can store more than two binary states. For example, a quad-level cell can be programmed to store one of 16 states, such as 1111, 0111, 0011, 1011, 1001, 0001, 0101, 1101, 1100, 0100, 0000, 1000, 1010, 0010, 0110, and 1110. The states can correspond to different threshold voltage (Vt) distributions that are separated from each other by Vt margins, such as sensing (e.g., read) margins. For example, a state can be sensed (e.g., read) using a sensing voltage that can be selected to lie within a Vt margin.

DETAILED DESCRIPTION

The present disclosure is directed to technological improvements to apparatus and to methods (e.g., processes) performed by the apparatus, such as technological improvements to data storage systems and to the methods performed by the data storage systems for determining data integrity (e.g., data quality). The disclosed embodiments can determine the integrity of non-sentinel data (e.g., user data and error correction (ECC) data, etc.) stored in a number of groups of non-sentinel memory cells from a relatively small amount of sentinel data (e.g., relatively much smaller than the amount of non-sentinel data) stored a group of sentinel memory cells by reading the group sentinel cells without having to read the number of groups non-sentinel cells. This can reduce the time it takes to determine the integrity of data compared to previous approaches that read relatively much larger amounts of data from a number of groups cells to determine the integrity of the data in each of the number of groups cells.

The integrity of non-sentinel data can be based on a determination of whether the sentinel data lacks integrity. The integrity of non-sentinel data that is stored before, and thus longer than, the sentinel data can be determined to lack integrity in response to determining that the sentinel data lacks integrity. Write stamps that can be indicative of when the non-sentinel data was last written to the number of groups of non-sentinel cells can be read, as opposed to reading the number of groups of non-sentinel cells, at least in their entirety, and can be compared to a write stamp corresponding to a group of sentinel cells that can be indicative of when the sentinel data was written to the group of sentinel cells. A refresh operation can be performed on a number of groups of non-sentinel cells corresponding to write stamps that are less than the write stamp corresponding to a group of sentinel cells whose sentinel data is determined to lack integrity. A write stamp corresponding to a group of cells can be correspond to the quantity of writes to an array of memory cells at the time data is written to the group of cells. Data stored in a group of cells corresponding to a lower write stamp can be stored before, and thus can be older than, data stored in a group of cells corresponding to a higher write stamp.

Prolonged temperature stresses and/or data-retention stresses, etc. can degrade the integrity of stored data. For example, exposing memory arrays to relatively high temperatures for prolonged periods of time and/or storing (e.g., retaining) data for prolonged periods of time can degrade the integrity of stored data.

The integrity of data that is read from a memory array can depend on the Vt margins previously described and or drifting of Vt distributions. For example, the integrity of the data can degrade as the Vt margins become smaller. Prolonged temperature stresses and/or data-retention stresses can cause Vt margins to shrink and/or Vt distributions to drift, thus degrading the integrity of the data.

In previous approaches, data was read to determine the integrity of the data based on the number of errors in reading the data. For example, the data might be refreshed (e.g., rewritten) in response to the data lacking integrity. However, there can be large amounts of data, and it can be time consuming to read such large amounts of data and to determine the integrity of such large amounts of data. This can degrade the performance of systems that employ such approaches.

Embodiments of the present disclosure solve the problems of prior approaches associated with reading relatively large amounts of data to determine the integrity of the data. Instead of reading relatively large amounts of data to determine the integrity of the data, the embodiments of the present invention determine the integrity of data stored in a number of groups of cells based on the integrity of sentinel data stored in a group of sentinel cells by reading the group of sentinel cells without reading the number of groups of cells. For example, a number of groups of cells corresponding to write stamps less than the write stamp corresponding to the group of sentinel cells can be refreshed in response to determining that the sentinel data in the group of sentinel cells lacks integrity. As a result, the amount of time associated with determining the integrity of the data is reduced, thereby improving the process of determining the integrity of the data. This can result improved data storage systems and improved data storage system operation.

Figure 1:
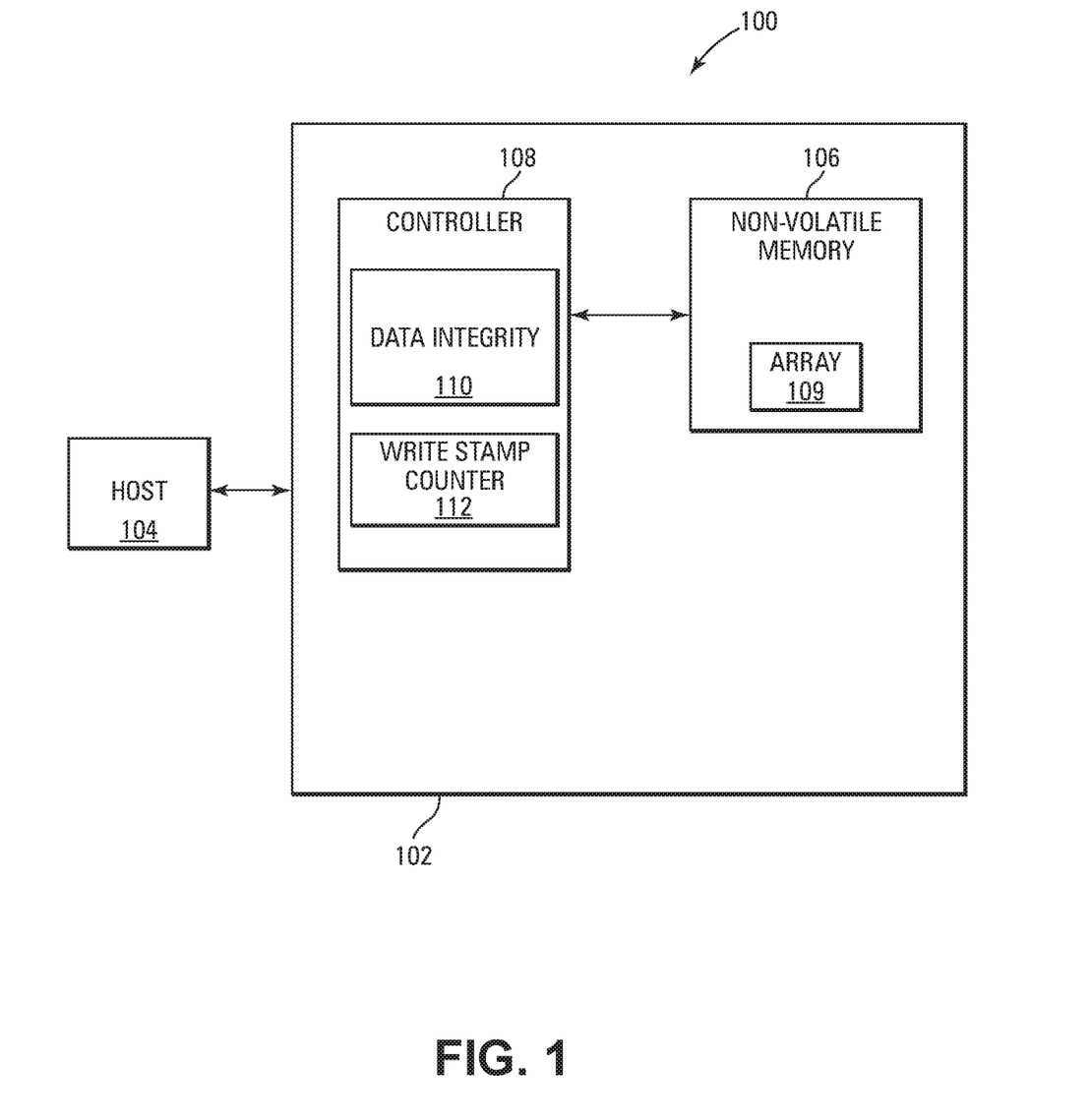
FIG. 1 is a block diagram of an apparatus, in accordance with a number of embodiments of the present disclosure.

FIG. 1 is a block diagram of an apparatus in the form of a computing system 100, in accordance with a number of embodiments of the present disclosure. Computing system 100 includes a memory system 102 that can be, for example, a storage system such as an SSD, a UFS device, an eMMC device, etc. However, embodiments are not limited to a particular type of memory system. For example, memory system 102 could serve as main memory for system 100.

As shown in FIG. 1, the system 102 can include a controller 108 coupled to a memory 106 and a host 104. Host 104 can be, for example, a host system such as a personal laptop computer, a desktop computer, a digital camera, a mobile device (e.g., cellular phone), network server, Internet of Things (IoT) enabled device, or a memory card reader, among various other types of hosts. For instance, host 104 can include one or more processors capable of accessing memory 106 (e.g., via controller 108) over an interface that can include a bus. The interface may be a standardized interface, such as a serial advanced technology attachment (SATA), peripheral component interconnect express (PCIe), or a universal serial bus (USB), among various others.

Memory 106 can include a number of memory devices (e.g., memory dies, chips, etc.) that each can comprise a number of arrays of memory cells 109. The arrays 109 can be NAND flash memory arrays, such as two-dimensional (2D) and/or three-dimensional (3D) NAND memory arrays. In some examples, arrays 109 can include 2D and/or 3D array structures such as cross point array structures. The memory cells can include, for example, flash memory cells or various types of resistance variable (e.g., PCRAM cells, RRAM cells, 3D cross point cells) that may comprise a resistance variable storage element and/or switch element. In a number of embodiments, the memory cells can be self-selecting memory (SSM) cells in which a single material can serve as both the storage element and the memory element.

Memory array 109 can be divided into addressable groups of memory cells that can be written to (e.g., programmed) in response to write commands that address the groups and that can be read in response to read commands that address the groups. In some examples, the groups of memory cells can have a physical address that corresponds to a logical address received from host 104. Controller 108 can include a mapping table, such as logical-to-physical (L2P) mapping table, that can map the logical addresses from host 104 to the physical addresses of the groups of memory cells. The groups of memory cells can be pages of memory cells corresponding to logical addresses or portions of pages of memory cells corresponding to logical addresses.

In some examples, each group can store user (e.g., host) data or sentinel data, such as a predetermined data pattern, error correction (ECC) data corresponding to the user data or sentinel data, metadata that can include a write count (e.g., a write stamp), and ECC data corresponding to the metadata. In some examples, each group can store codeword that can include the user data or sentinel data, the ECC data corresponding to the user data or sentinel data, the metadata, and the ECC data corresponding to the metadata. The user data can be data received from host 104. The write stamp can be the number of times array 109 has been written to at the time (e.g., when) the data was written to the corresponding group.

The groups of cells that store sentinel data can be referred to as groups of sentinel cells and the groups of cells that store data other than sentinel data, such as non-sentinel data, can be referred to as groups of non-sentinel cells. In some examples, groups of sentinel cells can contain the same sentinel data that can be fixed throughout the lifetime of system 102. A codeword that includes sentinel data can be referred to as a sentinel codeword and a codeword that includes non-sentinel data can be referred to as a non-sentinel codeword. Each sentinel codeword can contain the same sentinel data. Sentinel data be a pattern of all 1s, 0s, or a combination of 1s and 0s.

Controller 108 can include a data integrity component 110 that can perform the various methods disclosed herein. Integrity component 110 can read the sentinel data periodically and determine the integrity of the non-sentinel data and whether the user data should be refreshed based the integrity of the sentinel data (e.g., based on a number of errors that occur when reading the sentinel data) and based on when the non-sentinel data was written relative to when the sentinel data was written, such as based on the values of the write stamps corresponding to a number of groups of non-sentinel cells that store the non-sentinel data relative to the value of the write stamp corresponding to a group of sentinel cells that store the sentinel data.

In examples involving NAND memory, data can be refreshed by writing the data "out of place" (e.g., copying the data) to another location in a memory array. For example, the data can be copied from a group of cells having a first physical address, such as to a register, and subsequently written to a spare group of cells having second physical address. Controller 108 may then remap a logical address that was mapped to the first physical address to the second physical address.

In examples involving cross point memory cells, data can be refreshed by writing the data "in place" without first erasing the cells. For example, the data can be copied from a group of cells and subsequently written to a back to the group of cells by writing over the group of cells.

Integrity component 110 can determine that non-sentinel data that is written before the sentinel data lacks integrity, in response to the sentinel data lacking integrity (e.g., the sentinel data having a quantity of errors greater than a threshold quantity of errors). For example, integrity component 110 may determine that non-sentinel data stored in a number of groups of non-sentinel cells corresponding to write stamps that are less than the write stamp corresponding to a group of sentinel cells that store the sentinel data lacks integrity, in response to determining that the sentinel data lacks integrity.

Integrity component 110 may refresh the non-sentinel data that is determined to lack integrity. For example, integrity component 110 may refresh the non-sentinel data that is written before the sentinel data in response to the sentinel data having a quantity of errors greater than a threshold quantity of errors. Integrity component 110 may refresh the non-sentinel data stored in a number of groups of non-sentinel cells corresponding to write stamps that are less than the write stamp corresponding to a group of sentinel cells that store sentinel data determined to lack integrity.

Integrity component 110 can determine the integrity of the non-sentinel data in array 109 and whether the non-sentinel data needs to be refreshed without reading a number of groups of non-sentinel cells, at least in their entirety, that store the non-sentinel data and can thereby reduce the time required to determine the integrity of the non-sentinel data compared to previous approaches that determine the integrity by reading the non-sentinel data from each group of non-sentinel memory cells that is storing the non-sentinel data. For example, integrity component 110 can read the sentinel data from a group of sentinel cells and the write stamp corresponding to the group of sentinel cells from the group of sentinel cells. Integrity component 110 can then determine that the sentinel data lacks integrity based on the read. In response to the sentinel data lacking integrity, integrity component 110 can read the write stamps from the metadata in each group of non-sentinel cells that stores non-sentinel data, can compare the write stamps to the write stamp corresponding to the group of sentinel cells, and can determine the non-sentinel data in the groups of non-sentinel cells that have write stamps less than the write stamp corresponding to the group of sentinel cells to lack integrity. Integrity component 110 can then refresh the non-sentinel data determined to lack integrity.

In some examples, the respective write stamps corresponding to the respective groups of non-sentinel memory cells can be stored in respective entries of a table that can specify respective physical addresses in the memory array of the respective groups of non-sentinel memory cells or that can point to the respective groups of non-sentinel memory cells. In such examples, integrity component 110 can read the write stamps from the table in response to determining that the sentinel data lacks integrity.

Controller 108 can include a counter, such as a write stamp counter 112. Controller 108 can increment the write stamp (e.g., the write count) of counter 112 each time a respective write command is received for writing data to a respective group of cells of array 109. For example, the write stamp can be the number of writes to array 109 at the time of writing the data to a respective group of cells. Controller 108 can write the write stamp to the respective group of cells (e.g., as the metadata or a part of the metadata).

Integrity component 110 may write the sentinel data to a number of groups of sentinel cells periodically, such as once for every N times the non-sentinel data is written to a number of groups of non-sentinel cells. Integrity component 110 can monitor (e.g., track) the write stamps and compare the write stamps to N, a positive integer. For example, integrity component 110 may periodically write the sentinel data and the write stamp to a number of groups of sentinel cells each time the write stamp becomes a multiple of N. For example, integrity component 110 may write the sentinel data and the write stamp to a different group of sentinel memory cells (e.g., selected at random) each time the write stamp becomes a multiple of N. However, in some examples, integrity component 110 may write the sentinel data and the write stamp to the same group of sentinel memory cells a number of times, such as each time or a portion of the times the write stamp becomes a multiple of N.

Sentinel data can be written to the same group of memory cells based on the location of the group within array 109. For example, the group can be located in a region of array 109 that is more sensitive to temperature, a region in which temperatures tend to be greater than other regions of array 109, a region that is more sensitive to disturb, such as region relatively far from a column decoder, or the like.

Figure 2:
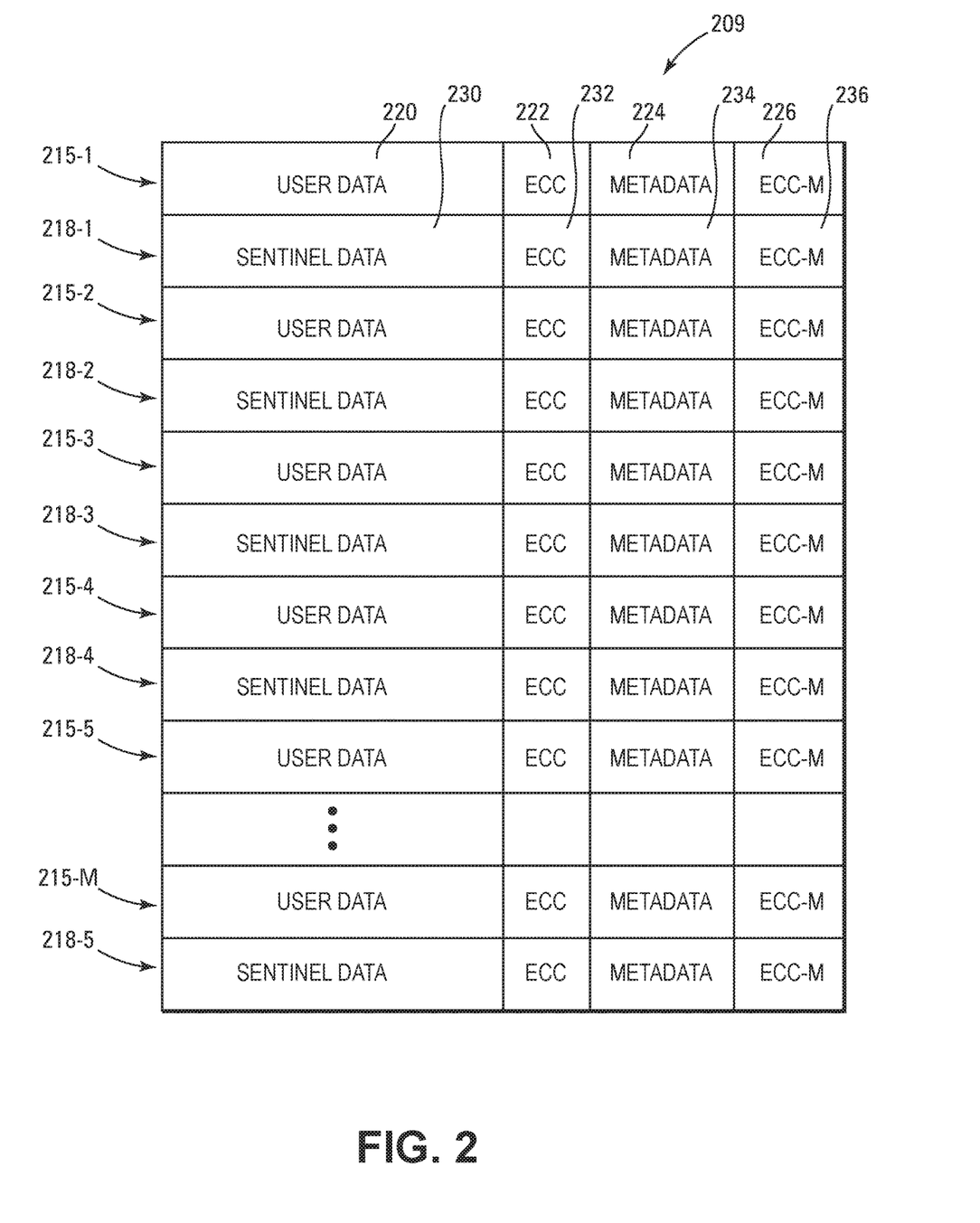
FIG. 2 is a block diagram of a memory array storing sentinel data and user data, in accordance with a number of embodiments of the present disclosure.

FIG. 2 illustrates an array 209 that can be a portion of array 109, in accordance with a number of embodiments of the present disclosure. For examples for which array 109 is a NAND array, array 209 can be a block of memory cells in which the memory cells are erased concurrently. In FIG. 2, array 209 is in a written state at a particular time. Array 209 includes respective groups of non-sentinel memory cells 215-1 to 215-M that can store respective non-sentinel codewords 215-1 to 215-M. Array 209 can include respective groups of sentinel memory cells 218-1 to 218-5 that can store respective sentinel codewords 218-1 to 218-5. However, there can be numbers of groups of sentinel memory cells other than five, for example, such as at times earlier or later than the particular time. For example, there might be fewer than five groups of sentinel memory cells at the earlier time and more than five groups of sentinel memory cells at the later time.

Each of the respective groups of non-sentinel memory cells 215 can include respective user data 220, respective ECC data 222 corresponding to the respective user data 220 for correcting the respective user data 220, respective metadata 224 that can include a respective write stamp corresponding to the respective user data 220, and respective ECC-M data 226 corresponding to the respective metadata 224 for correcting the respective metadata 224. Each of the respective groups of sentinel memory cells 218 can include respective sentinel data 230, respective ECC data 232 corresponding to the respective sentinel data 230 for correcting the respective sentinel data 230, respective metadata 234 that can include a respective write stamp corresponding to the respective sentinel data 230, and respective ECC-M data 236 corresponding to the respective metadata 234 for correcting the respective metadata 234.

Although FIG. 2 shows ECC data 232 for correcting sentinel data 230, in some examples, such as in which the sentinel data 230 might be predetermined and the same sentinel data 230 might be used for each group of sentinel memory cells 218, the ECC data 232 might not be needed because the number of errors in reading the sentinel data 230 can be determined by comparing the sentinel data 230 read from the groups of sentinel memory cells 218 to the predetermined sentinel data.

Figure 3:
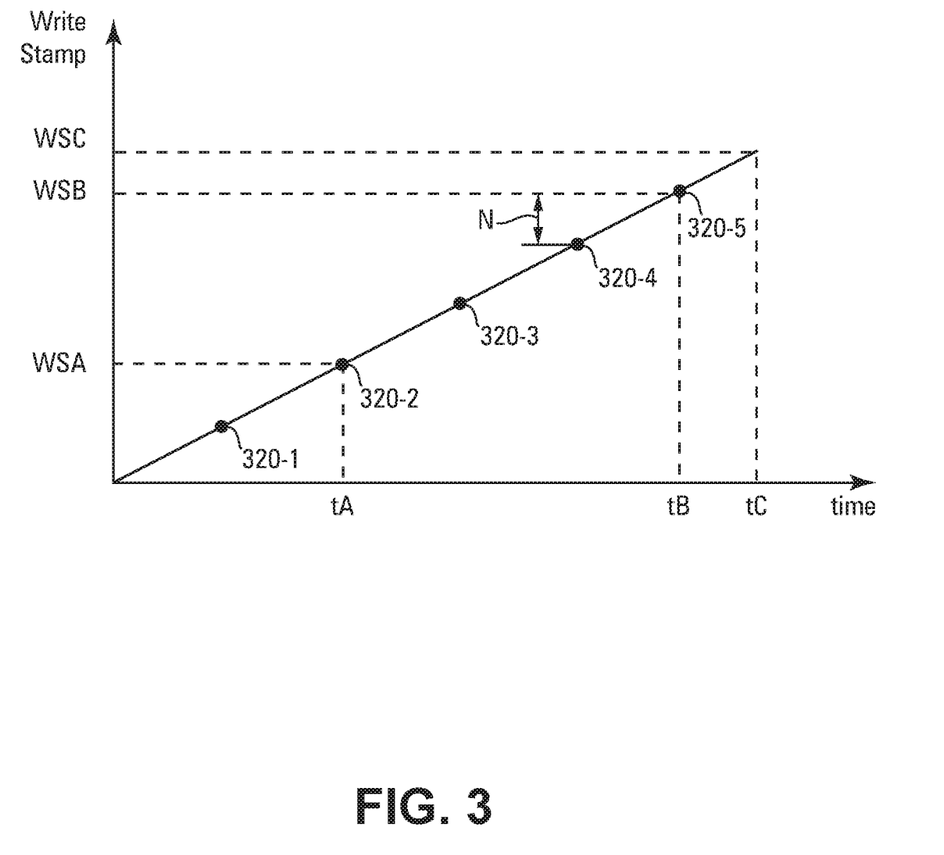
FIG. 3 is a plot of write stamps versus time, in accordance with a number of embodiments of the present disclosure.

FIG. 3 is a plot of the write stamps versus time for a memory array, such as memory array 209, in accordance with a number of embodiments of the present disclosure. The last time the memory array was written to was at time tC, at which time non-sentinel data, such as the non-sentinel data in the group of memory cells 215-M, was written to the memory array. For example, the group of memory cells 215-M can correspond to the write stamp WSC that can be in the metadata stored in the group of memory cells 215-M.

The data symbols in FIG. 3 correspond to the write stamps at the times at which the sentinel data were written. Symbols 320-1 to 320-5 can respectively correspond to the respective write stamps at the respective times the respective sentinel data in the respective groups of sentinel cells 218-1 to 218-5 were written. The respective write stamps corresponding to the respective symbols 320-1 to 320-5 can be respectively written in the metadata in the respective groups of sentinel cells 218-1 to 218-5 when the respective sentinel data are written to the respective groups of sentinel cells 218-1 to 218-5. For example, the write stamp WSA can be written in the metadata in the group of sentinel cells 218-2 at time to when the sentinel data is written in the group of sentinel cells 218-2, and the write stamp WSB can be written in the metadata in the group of sentinel cells 218-5 at time tB when the sentinel data is written in the group of sentinel cells 218-5.

Integrity component 110 can read the respective sentinel data in the respective groups of sentinel cells 218-1 to 218-5 to determine the integrity of the non-sentinel data the groups of non-sentinel cells 218-1 to 218-M. For example, the sentinel data in the groups of sentinel cells 218-1, 218-3, 218-4, and 218-5 can be determined to have integrity by having less than the threshold number of errors, but the sentinel data in sentinel codeword 218-2 can be determined to lack integrity by having more than the threshold number of errors. As a result, integrity component 110 may determine that all the non-sentinel data in array 209 written before the sentinel data in sentinel group of cells 218-2 may lack integrity and should be refreshed. For example, integrity component 110 may determine that the non-sentinel data stored in the groups of non-sentinel cells having write stamps less than the write stamp WSA of sentinel codeword 218-2 lacks integrity and should be refreshed. Integrity component 110 may determine that the non-sentinel data stored in the groups of non-sentinel cells having write stamps greater than or equal to the write stamp WSA of sentinel codeword 218-2 have integrity.

In some examples, integrity component 110 can keep track of the groups of sentinel cells 218-1 to 218-5 and their physical addresses so that it can periodically read all of the currently stored sentinel data and corresponding metadata. For example, integrity component 110 can maintain a table the physical addresses of the sentinel codewords or pointers to the sentinel codewords.

Figure 4:
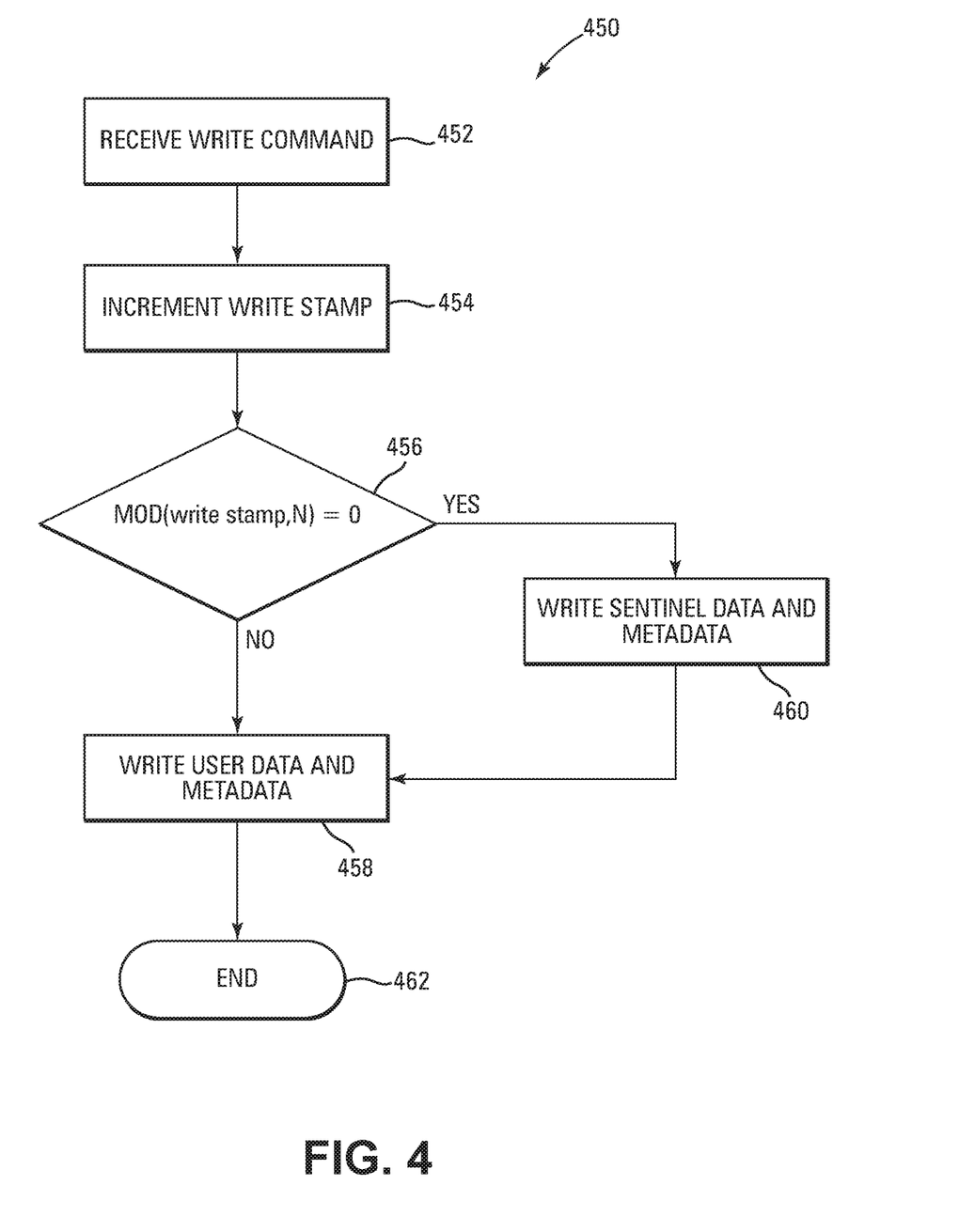
FIG. 4 is a flowchart of a write method, in accordance with a number of embodiments of the present disclosure.

FIG. 4 is a flowchart of a write method 450, in accordance with a number of embodiments of the present disclosure. At block 452, a write command is received at controller 108 from host 104. The write command can include a logical address to which user data is to be written. Controller 108 can map the logical address to a physical address of a group of memory cells (e.g., a group of non-sentinel memory cells). For examples involving a NAND memory, the group of user memory cells can be a free group, such as an erased group, of memory cells. For cross point, the user data can be written over existing data in the group of cells.

The write stamp is incremented at block 454. For example, counter 112 can increment the write stamp. At decision block 456, the incremented write stamp is compared to N to determine if the incremented write stamp is a multiple of N. For example, a modular operation can be performed at decision block 456 to determine if the incremented write stamp is a multiple of N.

The modular operation can include determining the modulus of the write stamp and N (e.g., MOD (write stamp, N)). For example, MOD (write stamp, N) is equal to the remainder of dividing the write stamp by N. If MOD (write stamp, N)=0, the remainder of dividing the write stamp by N is 0, meaning that the write stamp is a multiple of N.

If MOD (write stamp, N)≠0, then the user data and metadata, including the incremented write stamp, is written to the group of user memory cells corresponding to the logical address at block 458. If MOD (write stamp, N)=0, then sentinel data and metadata, including the incremented write stamp, is written to a selected group of memory cells (e.g., a group of sentinel memory cells) at block 460, and the user data and metadata, including the incremented write stamp, is written to the group of non-sentinel memory cells at block 458. The method ends at block 462.

As indicated previously, the sentinel data and metadata can be written to a different (e.g., randomly selected) group of memory cells each time the sentinel data and metadata are written, or the sentinel data and metadata can be written to the same group of memory cells each time the sentinel data and metadata are written. For example, a group of memory cells can be randomly selected to store the sentinel data in response to MOD (write stamp, N)=0.

As indicated previously, array 209 can be a block, such as a NAND block, of memory cells in which the memory cells are erased concurrently. For example, array 109 can include a number of such NAND blocks. In some examples, there can be write stamp for each of the NAND blocks. The respective write stamps can be the number of times the respective NAND blocks are written. For example, the respective write stamps can be incremented each time the respective NAND blocks are written. In some examples, data integrity component 110 can include (e.g., maintain) a table, such as a look-up table, that includes a respective write stamp for each respective NAND block.

In some examples, data integrity component 110 can determine whether to determine integrities of the respective NAND blocks (e.g., while memory system 102 is being powered up) based on their respective write stamps, such as from the writes stamps in the look-up table. Data integrity component 110 might read the sentinel cells more frequently in NAND blocks having a lower write stamps than in NAND blocks corresponding higher write stamps. For example, data stored in NAND blocks corresponding to lower write stamps can be stored before, and thus can be older than, data stored in NAND blocks corresponding to higher write stamps.

Adjusting the frequency at which NAND blocks are scanned for data integrity based on their write stamps can reduce the number of NAND blocks that are scanned during power up compared to previous approaches that scan all the NAND blocks for data integrity during power up. This can result in fewer operations during power up compared to previous approaches, thus resulting in faster power ups compared to previous approaches.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a number of" something can refer to one or more of such things. For example, a number of memory cells can refer to one or more memory cells. A "plurality" of something intends two or more. As used herein, multiple acts being performed concurrently refers to acts overlapping, at least in part, over a particular time period. As used herein, the term "coupled" may include electrically coupled, directly coupled, and/or directly connected with no intervening elements (e.g., by direct physical contact) or indirectly coupled and/or connected with intervening elements.

The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
    an array of memory cells; and
    a controller coupled to the array, wherein the controller is configured to:
        read a group of sentinel cells of the array;
        without reading a number of other groups of cells of the array determine that data stored in the number of other groups of cells lacks integrity based on:
            a determination that data stored in the group of sentinel cells lacks integrity; and
            a determination that the data stored in the group of sentinel cells is older than the data stored in the number of other groups of cells as identified by a first write stamp corresponding to the data stored in the group of sentinel cells and a second write stamp corresponding to the data stored in the number of other groups of cells; and
        update the second write stamp corresponding to the data stored in the number of other groups of cells only when the first write stamp is incremented as a multiple of a particular number of increments of the first write stamp, wherein the incremented first write stamp corresponds to a quantity of times the array is written to at a time at which the data is written to the group of sentinel cells.

2. The apparatus of claim 1, wherein the controller is configured to determine that the data stored in the group of sentinel cells lacks integrity in response to determining that the data stored in the group of sentinel cells comprises greater than a threshold quantity of errors.

3. The apparatus of claim 1, wherein the controller is configured to refresh the data stored in the number of other groups of cells responsive to determining that the data stored in the group of sentinel cells lacks integrity.

4. The apparatus of claim 3, wherein the controller is configured to:
    track the first write stamp corresponding to the group of sentinel cells;
    track the second write stamps corresponding the number of other groups of cells; and
    responsive to determining that the data stored in the group of sentinel cells lacks integrity, refresh only those groups of the number of other groups of cells whose corresponding second write stamp is less than the first write stamp corresponding to the group of sentinel cells.

5. The apparatus of claim 4, wherein
    the second write stamps corresponding to the number of other groups of cells comprise quantities of writes to the array at times when the data stored in the number of other groups of cells are written to the array; and
    the first write stamp corresponding to the group of sentinel cells is a quantity of writes to the array at a time when the data stored in the group of sentinel cells is written to the array.

6. The apparatus of claim 1, wherein the controller is configured to write data to the group of sentinel cells once for every N times that data is written to the number of other groups of cells.

7. The apparatus of claim 6, wherein the data that is written to the group of sentinel cells once for every N times that the data is written to the number of other groups of cells is a same predetermined sentinel data.

8. The apparatus of claim 1, wherein the controller is configured to periodically change which group of cells is used as the group of sentinel cells.

9. The apparatus of claim 1, wherein the group of sentinel cells is one of a plurality of groups of sentinel cells to which sentinel data and write stamps corresponding to the respective groups of sentinel cells are periodically written.

10. The apparatus of claim 1, wherein:
    the group of sentinel cells is part of a block of memory cells of the array;
    the block corresponds to the first write stamp, and
    the controller is configured to read the group of sentinel cells at a frequency that is based on the first write stamp.

11. The apparatus of claim 1, wherein the array comprises at least one of a NAND flash array, an array of cross point array structures, an array of resistance variable memory cells, and an array of self-selecting memory cells.

12. An apparatus, comprising:
    an array of memory cells; and
    a controller coupled to the array of memory cells, wherein the controller is configured to:
        perform a read on a group of sentinel memory cells of the array, wherein the group of sentinel memory cells stores sentinel data and a first write stamp corresponding to the group of sentinel memory cells;
        determine a quality of the sentinel data based on the read;
        responsive to a determination that the sentinel data lacks quality:
            determine second write stamps corresponding to respective groups of non-sentinel memory cells of the array;
            update the second write stamp corresponding to respective groups of non-sentinel memory cells of the array only when the first write stamp is incremented as a multiple of a particular number of increments of the first write stamp, wherein the incremented first write stamp corresponds to a quantity of times the array is written to at a time at which the data is written to the group of sentinel memory cells; and
            for those respective groups of non-sentinel memory cells whose determined second write stamps indicate they were written prior to the group of sentinel memory cells, perform a refresh operation.

13. The apparatus of claim 12, wherein the controller is configured to determine that the sentinel data lacks quality in response to determining that the sentinel data comprises greater than a threshold quantity of errors.

14. The apparatus of claim 12, wherein the second write stamps corresponding to the respective groups of non-sentinel memory cells are stored as metadata in the respective groups of non-sentinel memory cells.

15. The apparatus of claim 12, wherein the second write stamps corresponding to the respective groups of non-sentinel memory cells are stored in respective entries of a table that point to the respective groups of non-sentinel memory cells.

16. A method, comprising:
reading sentinel data from each of a number of groups of sentinel memory cells in a memory array;
without reading non-sentinel data from respective groups of non-sentinel memory cells in the array:
determining an integrity of respective non-sentinel data stored in the respective groups of non-sentinel memory cells based on reading the sentinel data from each of the number groups of sentinel memory cells; and
determining that the sentinel data is older than the respective non-sentinel data stored as identified by a first write stamp corresponding to the sentinel data and second write stamps corresponding to the respective non-sentinel data; and
updating the second write stamp corresponding to the respective non-sentinel data only when the first write stamp is incremented as a multiple of a particular number of increments of the first write stamp, wherein the incremented first write stamp corresponds to a quantity of times the array is written to at a time at which the data is written to the sentinel data.

17. The method of claim 16, further comprising determining the integrity of the respective non-sentinel data stored in the respective groups of non-sentinel memory cells based on a quantity of errors in reading the sentinel data from each of the number of groups of sentinel memory cells.

18. The method of claim 17, further comprising determining that the respective non-sentinel data lacks integrity in response to determining that the respective non-sentinel data is written in the respective groups of non-sentinel memory cells before the sentinel data is written to a particular group of the number of groups of sentinel memory cells and in response to determining that the quantity of errors in reading sentinel data written to the particular group is greater than a threshold quantity of errors.

19. The method of claim 16, further comprising:
reading the second write stamps from the respective groups of non-sentinel memory cells in response to determining that the sentinel data from a particular group of the number of groups of sentinel memory cells lacks integrity; and
comparing the second write stamps read from the respective groups of non-sentinel memory cells to the first write stamp read from the particular group.

20. The method of claim 19, further comprising determining that the respective non-sentinel data, in respective groups of non-sentinel memory cells having respective write stamps that is less than the first write stamp read from the particular group, lacks integrity.

* * * * *